United States Patent
Michel

(10) Patent No.: US 7,923,189 B2
(45) Date of Patent: Apr. 12, 2011

(54) HYDROPHOBIC SALTS OF LAYERED METAL HYDROXIDES

(75) Inventor: Eduard Michel, Schliengen (DE)

(73) Assignee: Clariant Produkte (Deutschland) GmbH, Frankfurt am Main (DE)

( * ) Notice: Subject to any disclaimer, the term of this patent is extended or adjusted under 35 U.S.C. 154(b) by 930 days.

(21) Appl. No.: 11/628,912

(22) PCT Filed: May 6, 2005

(86) PCT No.: PCT/EP2005/004915
§ 371 (c)(1),
(2), (4) Date: Jul. 24, 2007

(87) PCT Pub. No.: WO2005/121258
PCT Pub. Date: Dec. 22, 2005

(65) Prior Publication Data
US 2008/0070139 A1    Mar. 20, 2008

(30) Foreign Application Priority Data

Jun. 11, 2004   (DE) .......................... 10 2004 028 493

(51) Int. Cl.
*G03G 9/097* (2006.01)
(52) U.S. Cl. ............... 430/108.1; 430/108.3; 430/108.4; 430/108.8
(58) Field of Classification Search ............... 430/108.1, 430/108.3, 108.4, 108.8
See application file for complete search history.

(56) References Cited

U.S. PATENT DOCUMENTS

| | | | |
|---|---|---|---|
| 3,607,337 A | 9/1971 | Eisenmenger et al. | |
| 4,772,434 A * | 9/1988 | Myers ............................... | 264/8 |
| 5,288,581 A | 2/1994 | Ziolo | |
| 5,292,910 A | 3/1994 | Raths et al. | |
| 5,326,891 A | 7/1994 | Breuer et al. | |
| 5,482,806 A | 1/1996 | Suzuki et al. | |
| 5,871,845 A | 2/1999 | Dahringer et al. | |
| 2005/0277040 A1 | 12/2005 | Michel et al. | |
| 2006/0020069 A1 | 1/2006 | Michel et al. | |

FOREIGN PATENT DOCUMENTS

| | | |
|---|---|---|
| DE | 4010606 | 10/1991 |
| DE | 4034305 | 4/1992 |
| DE | 4321289 | 1/1995 |
| WO | WO 01/40878 | 6/2001 |
| WO | WO 2004/019137 | 5/2004 |

OTHER PUBLICATIONS

U.S. Appl. No. 11/596,639, by Michel et al., filed Nov. 14, 2006.
PCT International Search Report for PCT/EP2005/004915 mailed Jul. 11, 2005.
English abstract for JP 10090941, Apr. 10, 1998.
PCT English Translation of International Preliminary Report on Patentability for PCT/EP 2005/004915, mailed Jul. 5, 2007.

* cited by examiner

*Primary Examiner* — Hoa V Le
(74) *Attorney, Agent, or Firm* — Anthony A. Bisulca

(57) ABSTRACT

The invention relates to hydrophobic salts of layer-like metal hydroxides, which are obtainable by adding to a layer-like metal hydroxide salt, which contains trivalent, divalent and optionally monovalent metal cations and one or more organic anions A of the formula (1)

$$X\text{—}R\text{—}Y \qquad (1),$$

wherein
  X denotes hydrogen, hydroxyl, carboxyl, sulfato or sulfo;
  Y denotes carboxyl, sulfato or sulfo, and
  R denotes an aliphatic, cycloaliphatic, heterocycloaliphatic, olefinic, cycloolefinic, heterocycloolefinic, aromatic, heteroaromatic, araliphatic or heteroaraliphatic radical having 2 to 50 C atoms, wherein one or more substituents from the group consisting of hydroxyl, amino, halogen, $C_1$-$C_{22}$-alkyl, $C_1$-$C_{22}$-alkoxy, $C_1$-$C_{22}$-alkylene-(CO)—O—$(CH_2CH_2O)_{0\text{-}50}$-alkyl, $C_1$-$C_{22}$-alkylene-(CO)—O—$(CH_2CH_2O)_{0\text{-}50}$-haloalkyl, carboxyl, sulfo, nitro or cyano can be present, in dispersion, with intensive thorough mixing, one or more hydrophobic compounds from the group consisting of waxes and metal soaps in an amount of from 0.2 to 200 wt. %, based on the metal hydroxide salt, and optionally removing the liquid medium, drying the product and isolating it as a powder.

The compounds according to the invention are employed as charge control agents, in particular in electrophotography.

15 Claims, No Drawings

HYDROPHOBIC SALTS OF LAYERED METAL HYDROXIDES

The present invention relates to the field of charge controlling agents in the sense of a component which selectively influences electrostatic charging properties in a matrix.

In electrophotographic recording processes, a "latent charge image" is generated on a photoconductor. This "latent charge image" is developed by application of an electrostatically charged toner, which is then transferred, for example, to paper, textiles, film or plastic, and fixed, for example, by means of pressure, radiation, heat or the action of solvent. Typical toners are one- or two-component powder toners (also called one- or two-component developers), and special toners, such as e.g. magnetic toners, liquid toners or polymerization toners, are moreover also employed. Polymerization toners are to be understood as meaning those toners which are formed e.g. by suspension polymerization (condensation) or emulsion polymerization and lead to improved particle properties of the toner. The term also means those toners which are produced in non-aqueous dispersions.

The specific charging q/m (charge per unit weight) of a toner is a measure of its quality. In addition to the symbol and the level of the electrostatic charging, rapid achievement of the desired charge level, the constancy of this charge over a relatively long activation period and the insensitivity of the toner to climatic influences, such as temperature and atmospheric humidity, is an important quality criterion.

Both positively and negatively chargeable toners are used in copiers and laser printers, according to the type of process and apparatus.

In order to obtain electrophotographic toners or developers having either positive or negative charging, charge controlling agents are often added. Since toner binders frequently show a marked dependency of the charging on the activation time, the task of a charge controlling agent is on the one hand to establish the symbol and level of the toner charging, and on the other hand to counteract the charging drift of the toner binder and to ensure constancy of the toner charging. Furthermore, it is important in practice that the charge controlling agents have an adequate heat stability and a good dispersibility. Typical temperatures for incorporating charge controlling agents into the toner resins are between 100° C. and 200° C. if kneaders or extruders are used. A heat stability of 200° C. is accordingly of great advantage. It is also important for the heat stability to be ensured over a relatively long period of time (approx. 30 minutes) and in various binder systems.

For a good dispersibility, it is advantageous if the charge controlling agent shows no wax-like properties, no tackiness and a melting or softening point of >150° C., preferably >200° C. Tackiness often leads to problems in metering into the toner formulation, and low melting or softening points can mean that no homogeneous distribution is achieved during the dispersing in, since the material merges in droplet form in the carrier material.

Typical toner binders are polymerization, polyaddition and polycondensation resins, such as styrene, styrene acrylate, styrene-butadiene, acrylate, polyester and phenol-epoxy resins, as well as cycloolefin copolymers, individually or in combination, which can also contain further constituents, e.g. coloring agents, such as dyestuffs and pigments, waxes or flow auxiliaries, or can acquire these afterwards as additives, such as highly disperse silicas.

Charge controlling agents can also be employed for improving the electrostatic charging of powders and lacquers, in particular in triboelectrically or electrokinetically sprayed powder coatings, such as are used for surface coating of objects of, for example, metal, wood, plastic, glass, ceramic, concrete, textile material, paper or rubber.

Epoxy resins, carboxyl and hydroxyl group-containing polyester resins, polyurethane resins and acrylic resins, together with the conventional curing agents, are typically employed as powder coating resins. Combinations of resins are also used. Thus, for example, epoxy resins are frequently employed in combination with carboxyl and hydroxyl group-containing polyester resins.

It has furthermore been found that charge controlling agents can considerably improve the charging and the charge stability properties of electret materials, in particular electret fibers (DE-A-43 21 289). Typical electret materials are based on polyolefins, halogenated polyolefins, polyacrylates, polyacrylonitriles, polystyrenes or fluorinated polymers, such as, for example, polyethylene, polypropylene, polytetrafluoroethylene and perfluorinated ethylene and propylene, or on polyesters, polycarbonates, polyamides, polyimides or polyetherketones, on polyarylene sulfides, in particular polyphenylene sulfides, on polyacetals, cellulose esters, polyalkylene terephthalates and mixtures thereof. Electret materials, in particular electret fibers, can be employed, for example, for extremely fine dust filtration. The electret materials can obtain their charge by corona charging or tribocharging.

Charge controlling agents can furthermore be used in electrostatic separation operations, in particular in separation operations on polymers. Without charge controlling agents, low density polyethylene (LDPE) and high density polyethylene (HDPE) become charged triboelectrically in a substantially similar manner. After addition of charge controlling agents, LDPE becomes highly positively charged and HDPE highly negatively charged, and can thus be easily separated. In addition to the external application of charge controlling agents, incorporation thereof into the polymer is also possible, in order, for example, to shift a polymer within the triboelectric voltage series and to obtain a corresponding separating action. Other polymers, such as e.g. polypropylene (PP) and/or polyethylene terephthalate (PET) and/or polyvinyl chloride (PVC), can likewise be separated from one another in this manner.

Salt minerals can also be separated if an agent which improves the substrate-specific electrostatic charging has been added to them beforehand (surface conditioning).

Charge controlling agents are furthermore employed as electroconductivity providing agents (ECPA) in inks for inkjet printers and for electronic inks or electronic paper.

In U.S. Pat. No. 5,288,581, certain hydrotalcites are employed as charge controlling additives.

JP 10-090 941 describes the use of a hydrotalcite hydrophobized by means of fatty acids as an external additive in combination with a positive charge controlling agent. In this context, the additive serves to improve the flowability of the toner. In WO 2004/019 137 A1, layer-like double hydroxides are used as charge controlling agents.

The object of the present invention was to discover active and ecotoxicologically acceptable charge controlling agents which have a high rapid charging and high charge stability, and moreover show only a low sensitivity to various atmospheric humidity conditions, in particular high atmospheric humidities. They should furthermore be very readily dispersible, without decomposition, in various toner binders used in practice, such as polyesters, polystyrene acrylates or polystyrene-butadienes/epoxy resins and cycloolefin copolymers. Their action should furthermore be largely independent of the resin/carrier combination, in order to open up a wide use. They should likewise be readily dispersible, without decomposition, in the usual powder coating binders and electret materials, such as e.g. polyester (PES), epoxide, PES-epoxy hybrid, polyurethane, acrylic systems and polypropylenes.

In respect of their electrostatic efficiency, the charge controlling agents should already be active at the lowest possible concentration (1% or less) and should not lose this efficiency in combination with carbon black or other coloring agents. It is known that coloring agents can have in some cases a lasting influence on the triboelectric charging of toners.

Surprisingly, it has now been found that the hydrophobic salts of layer-like metal hydroxides described below meet the above requirements.

The present invention therefore provides a hydrophobic salt of a layer-like metal hydroxide, which is obtainable by adding to a layer-like metal hydroxide salt, which contains trivalent, divalent and optionally monovalent metal cations and one or more organic anions A of the formula (1)

$$X\text{---}R\text{---}Y \quad (1),$$

wherein

X denotes hydrogen, hydroxyl, carboxyl, sulfato or sulfo;
Y denotes carboxyl, sulfato or sulfo, and
R denotes an aliphatic, cycloaliphatic, heterocycloaliphatic, olefinic, cycloolefinic, heterocycloolefinic, aromatic, heteroaromatic, aralipathic or heteroaraliphatic radical having 2 to 50 C atoms, in particular 2 to 44 C atoms, preferably 2 to 32 C atoms, wherein one or more, preferably 1, 2, 3 or 4 substituents from the group consisting of hydroxyl, amino, halogen, $C_1$-$C_{22}$-alkyl, $C_1$-$C_{22}$-alkoxy, $C_1$-$C_{22}$-alkylene-(CO)—O—($CH_2CH_2O$)$_{0-50}$-alkyl, $C_1$-$C_{22}$-alkylene-(CO)—O—($CH_2CH_2O$)$_{0-50}$-haloalkyl, carboxyl, sulfo, nitro or cyano can be present, in dispersion, with intensive thorough mixing, one or more hydrophobic compounds from the group consisting of waxes and metal soaps in an amount of from 0.2 to 200 wt. %, for example 1 to 200 wt. %, preferably 1.5 to 150 wt. %, particularly preferably 2 to 100 wt. %, based on the metal hydroxide salt, and optionally removing the liquid medium, drying the product and isolating it as a powder.

The salts according to the invention are characterized in that the metal hydroxide is a multiple hydroxide, wherein the molar ratio of the divalent metal cations to the trivalent metal cations is between 1,000 and 0.001, in particular between 100 and 0.01, and the hydroxide can also be in a form dried by splitting off of water or a calcined form as a mixed oxide-hydroxide or as an oxide.

The salts according to the invention can also contain water molecules as water of crystallization or embedded between individual layers, and consist of forms of the metal hydroxide/oxides prepared hydrothermally and treated according to the invention.

Possible monovalent metal ions are, in particular, $Li^+$, $Na^+$, $K^+$, $Rb^+$, $Cs^+$, Cu+ or $Ag^+$.

Possible divalent metal cations are, in particular, $Mg^{2+}$, $Ca^{2+}$, $Sr^{2+}$, $Ba^{2+}$, $Zn^{2+}$, $Co^{2+}$, $Ni^{2+}$, $Fe^{2+}$, $Cu^{2+}$ or $Mn^{2+}$.

Possible trivalent metal cations are, in particular, $Al^{3+}$, $Fe^{3+}$, $Co^{3+}$, $Mn^{3+}$, $Cr^{3+}$, $Sc^{3+}$, and $B^{3+}$.

Double hydroxide salts which contain $Mg^{2+}$ and $Al^{3+}$, in particular in the molar ratio of 100:1 to 1:100, are particularly preferred.

The layer-like metal hydroxide salt preferably corresponds to the formula (2)

$$[M(I)_{y_1}M(II)_{y_2}M(III)_x(OH)_2]A_{(x/z)}\cdot nH_2O \quad (2)$$

wherein:
$0<x<1$;
$0<y_2<1$ and $y_2 \leqq (1-x)$;
$y_1=2-2x-2y_2$;

z is the negative charge of an anion A or the average negative charge in the case of several anions,
n is a number from 0 to 20,
M(I) represents one or more monovalent metal cations,
M(II) represents one or more divalent metal cations,
M(III) represents one or more trivalent metal cations, and
A is as defined above.

A can be an organic anion of the formula (1) having one or more charges. The amount of the anions A is determined by the stoichiometry of the positive and negative charges in the hydroxide/oxide salt such that the sum of all the charges is zero. It is also possible for some, for example 5 to 95 mol %, preferably 10 to 90 mol %, in particular 20 to 80 mol %, of the anions of the formula (1) to be replaced by other anions, such as e.g. inorganic anions, such as halide, bicarbonate, carbonate, sulfate, nitrate, phosphate, or borate or acetate. Possible organic anions A are, preferably, those from the group consisting of benzilic acid, salicylic acid, benzoic acid, naphthalenedisulfonic acids, e.g. naphthalene-1,5-disulfonic acid, naphthalenedicarboxylic acids, hydroxynaphthoic acids, e.g. 1-hydroxy-2-naphthoic acid, 2-hydroxy-1-naphthoic acid, 3-hydroxy-2-naphthoic acid, lactic acid, stearic acid, arachic acid, behenic acid, erucic acid, octanedicarboxylic acid, decanedicarboxylic acid (sebacic acid), dodecanedicarboxylic acid, tetradecanedicarboxylic acid, hexadecanedicarboxylic acid, octadecanedicarboxylic acid, naphthalenetetracarboxylic acid, sulfosuccinic acid ($C_6$-$C_{20}$)-alkyl monoesters, sulfosuccinic acid ($C_6$-$C_{22}$)-fluoroalkyl monoesters.

In the context of the present invention, possible waxes are acid waxes, for example montan acid waxes or partly esterified or partly saponified montan acid waxes, ester waxes, for example hydroxystearic acid ester waxes, montan acid ester waxes or partly hydrolyzed montan acid ester waxes, amide waxes, for example $C_{18}$-$C_{44}$-fatty acid amide waxes, carnauba waxes, polyolefin waxes, for example polyethylene or polypropylene waxes, polyolefin degradation waxes, oxidized PE, PP or paraffin waxes, PP waxes modified by grafting with further monomers, such as, for example, silanes, acrylic acid derivatives, methacrylic acid derivatives, maleic anhydride or styrene, polyolefin-metallocene waxes and paraffin waxes.

A characteristic of the said waxes is a relatively sharp melting or drop point of 40-200° C., above the drop point a relatively low-viscosity consistency with viscosities in a range of 5-5,000 mPas, a coarsely to finely crystalline structure, a molecular weight of 250-20,000 g/mol (number-average $M_n$), polishability under gentle pressure, relatively low acid numbers of 0-200 mg of KOH/g, and an extremely low water-solubility, also above the drop or melting point and simultaneously alkaline pH conditions.

Metal salts are salts of higher-valency, i.e. di-, tri- or tetravalent metal ions with an acid component from the group consisting of saturated or unsaturated, linear or branched $C_7$-$C_{43}$-carboxylic acids, $C_8$-$C_{44}$-sulfonates, $C_8$-$C_{44}$-sulfates, $C_8$-$C_{44}$-alkyl ether-sulfates, $C_8$-$C_{44}$-alkylamido ether-sulfates, $C_8$-$C_{44}$-aralkylsulfonates (wherein aryl denotes $C_6$-$C_{12}$ and alkyl denotes $C_1$-$C_{32}$), $C_8$-$C_{44}$-alkyl ether-sulfosuccinates, $C_8$-$C_{44}$—N-alkylsulfosuccinamates, $C_8$-$C_{44}$-acyl glutamates, $C_8$-$C_{44}$-fatty acid isethionates, $C_8$-$C_{44}$-fatty acid methyltaurides, $C_8$-$C_{44}$-fatty acid sarcosides, $C_8$-$C_{44}$-phosphates, acid waxes, partly esterified acid waxes, partly hydrolyzed ester waxes or oxidized PE or paraffin waxes, in particular Al, Ba, Sr, Ca, Fe, Co, Cu, Mg, Mn, Ni, Pb, ZrO, TiO and Zn stearates, behenates, erucates, palmitates, oleates, linoleates, resinates, laurates, myristates, naphthenates, tallates, dodecylsulfates, secondary alkylsulfonates, dodecylbenzenesulfonates and N-(1,2-dicarboxyethyl)-N-octadecylsulfosuccinamates.

Hydrophobic double hydroxide salts having a molar ratio of Mg:Al of from 1,000:1 to 1:1,000, with 0.1 to 30 wt. % of sebacic acid and/or 0.1 to 75 wt. % of stearic acid as the organic anion, and 0.5 to 150 wt. %, for example 1 to 150 wt. %, in each case based on the total weight of the Mg—Al double hydroxide salt, of montan acid waxes partly esterified montan acid waxes, hydroxystearic acid ester waxes, erucic acid amide waxes, behenic acid amide waxes, carnauba waxes, montan acid ester waxes, partly hydrolyzed montan acid ester waxes, polyolefin waxes which are oxidized or rendered polar by grafting, oxidized paraffin waxes or two and trivalent metal salts, in particular Zn, Pb, Sn, TiO, ZrO, Mg, Ca, Sr, Ba, Al salts of saturated or unsaturated linear or branched $C_7$-$C_{43}$-carboxylic acids, $C_8$-$C_{44}$-sulfonates, $C_8$-$C_{44}$-sulfates, $C_8$-$C_{44}$-alkyl ether-sulfates, $C_8$-$C_{44}$-alkylamido ether-sulfates, $C_8$-$C_{44}$-aralkylsulfonates (wherein aryl denotes $C_6$-$C_{12}$ and alkyl denotes $C_1$-$C_{32}$), $C_8$-$C_{44}$-alkyl ether-sulfosuccinates, $C_8$-$C_{44}$-N-alkylsulfosuccinamates, $C_8$-$C_{44}$-acyl glutamates, $C_8$-$C_{44}$-fatty acid isethionates, $C_8$-$C_{44}$-fatty acid methyltaurides, $C_8$-$C_{44}$-fatty acid sarcosides, $C_8$-$C_{44}$-phosphates, acid waxes, partly esterified acid waxes, partly hydrolyzed ester waxes or oxidized PE or paraffin waxes are preferred as the hydrophobic compound. Hydrophobic layer-like magnesium-aluminum double hydroxide carbonates with 0.1 to 4 wt. % of carbonate, having a molar ratio of Mg to Al of from 5:1 to 1:5, optionally in the hydrothermal or calcined form, which contain 0.1 to 20 wt. % of mono- or di-anions of sebacic acid, and/or 0.1 to 50 wt. % of stearic acid, and 1 to 100 wt. %, for example 2 to 100 wt. %, in each case based on the total weight of the Mg—Al double hydroxide carbonate, of one or more waxes from the group consisting of montan acid waxes, montan acid ester waxes, partly hydrolyzed montan acid ester waxes, hydroxystearic acid ester waxes, erucic acid amide waxes, behenic acid amide waxes, carnauba waxes, oxidized or grafted polyolefin waxes, oxidized paraffin waxes or the di- or trivalent metal salts saturated or unsaturated, linear or branched $C_7$-$C_{43}$-carboxylic acids, $C_8$-$C_{44}$-sulfonates, $C_8$-$C_{44}$-sulfates, $C_8$-$C_{44}$-alkyl ether-sulfates, $C_8$-$C_{44}$-alkylamido ether-sulfates, $C_7$-$C_{44}$-aralkylsulfonates (wherein aryl denotes $C_6$-$C_{12}$ and alkyl denotes $C_1$-$C_{32}$), $C_8$-$C_{44}$-alkyl ether-sulfosuccinates, $C_8$-$C_{44}$-N-alkylsulfosuccinamates, $C_8$-$C_{44}$-acyl glutamates, $C_8$-$C_{44}$-fatty acid isethionates, $C_8$-$C_{44}$-fatty acid methyltaurides, $C_8$-C-fatty acid sarcosides, $C_8$-$C_{44}$-phosphates, in particular Mg, Ca, Zn, Al, ZrO salts of stearic acid, arachic acid, palmitic acid, myristic acid, lauric acid, behenic acid, erucic acid, dodecylsulfate, secondary $C_{10}$-$C_{20}$-alkylsulfonates, dodecylbenzenesulfonate or N-(1,2-dicarboxyethyl)-N-octadecylsulfosuccinamate, are of particular interest.

The layer-like metal hydroxide salts themselves and also the compounds described according to the invention can be prepared by direct reaction of calcined, non-calcined or hydrothermally prepared metal hydroxides/oxides with the corresponding organic acids or salts thereof according to formula (1) and with the waxes or metal soaps, while heating in a mixing unit, such as, for example, a kneader, extruder, dissolver, a bead mill, a Henschel mixer or a mill.

The preparation of the layer-like metal hydroxide salts themselves is furthermore also possible by reaction of salts of the metal cations which build up the metal hydroxide/oxide, such as, for example, magnesium chloride and aluminum chloride, in aqueous alkaline solution with the simultaneous presence of the acid or the salt of at least one of the organic anions A, and optionally a subsequent intermediate isolation step.

Starting substances for salts of the metal hydroxides/oxides in the context of the present invention are, for example, hydrotalcites, which are usually commercially obtainable and contain an inorganic anion, usually carbonate. Hydrotalcites as such are described, for example, in DE-A-40 10 606 and in DE-A-40 34 305.

It is known to add to the binder of an electrophotographic toner relatively large amounts of wax, for example 3 to 5 wt. %, based on the weight of the binder, in order, for example, to separate off the toner in the photocopying process more easily from the photoconductor (cold anti-offset) or the fixing rolls (hot anti-offset) or also in order to lower the glass transition point of the polymeric binder. However, the object according to the invention is not achieved by the external addition of wax. Only by the treatment according to the invention of the layer-like metal hydroxide salt is hydrophobizing of the charge controlling agent effected in a manner such that the desired charge controlling properties are achieved and are rendered insensitive to environmental influences, in particular to relatively high atmospheric humidity.

It is presumed that the hydrophobic compound, that is to say the wax or the metal soap, is embedded between the organic ions of the metal hydroxide and/or adsorbed onto the surface of the layer-like metal hydroxide salt.

The invention also provides a process for the preparation of the hydrophobic layer-like metal hydroxide salts by adding to a layer-like metal hydroxide salt, which contains trivalent, divalent and optionally monovalent metal cations and one or more organic anions A of the formula (1), as described above, in aqueous, aqueous-organic or organic dispersion, with intensive thorough mixing, one or more hydrophobic compounds from the group consisting of waxes and metal soaps in an amount of from 0.2 to 200 wt. %, for example 1 to 200 wt. %, preferably 1.5 to 150 wt. %, particularly preferably 2 to 100 wt. %, in particular 3 to 75 wt. %, based on the metal hydroxide salt, and optionally removing the liquid medium, drying the product and isolating it as a powder.

The hydrophobic compound can also be added before and/or during the reaction of the layer-like metal hydroxide with the organic anion(s) A.

The invention also provides a process for the preparation of the hydrophobic layer-like metal hydroxide salts by reacting a layer-like metal hydroxide salt, which contains trivalent, divalent and optionally monovalent metal cations, in the presence of from 0.2 to 200 wt. %, for example 1 to 200 wt. %, preferably 1.5 to 150 wt. %, particularly preferably 2 to 100 wt. %, in particular 3 to 75 wt. %, based on the metal hydroxide salt, of one or more hydrophobic compounds from the group consisting of waxes and metal soaps, in aqueous, aqueous-organic or organic dispersion, with intensive thorough mixing, with one or more organic anions A of the formula (1), as described above, and optionally removing the liquid medium, drying the product and isolating it as a powder.

The salts of layer-like metal hydroxides/oxides are preferably prepared in an aqueous medium in a pH of from 0 to 14 and at a temperature of between 0 and 190° C., preferably while stirring and optionally also under pressure. The preparation can optionally also be carried out under autoclave conditions, and at temperatures of between 5 and 200° C., preferably between 20 and 190° C., in particular between 30 and 180° C. The preparation can also be carried out in organic solvents, such as, for example, alcohols, esters, ethers or ketones, under the conditions described, and in mixtures of water and one or more organic solvents in any desired ratio.

The organic anions can be employed in this context as a salt, e.g. as a sodium or potassium salt, or as an acid, in the solid state, for example as a powder or granules, in molten or dissolved form, for example in aqueous solution. The organic anions A can furthermore also be employed as acid halides, for example as acid chlorides, as acid anhydrides, as acid azides or acid esters. This applies in particular to the preparation in organic solvents.

Preferably, the hydrophobic compound is dissolved in an organic solvent and is added as a solution at a temperature of between 20 to 200° C., or the hydrophobic compound is added as an aqueous dispersion at a temperature of between 20 and 200° C. Here also, the aqueous dispersions can contain contents (up to 40 wt. %) of organic solvent, e.g. alcohol.

It is also possible to meter in the hydrophobic compound as a powder or slowly in molten form, for example in a fine jet in the course of at least 1 minute, expediently at a temperature of between 20 and 200° C.

The hydrophobic compound is added with intensive thorough mixing with the dispersion of the metal hydroxide, for example with intensive stirring with suitable stirring units, such as an Ultraturrax or propeller stirrer, a bead mill, or also with the aid of ultrasound.

For use of the hydrophobic compound in dispersion or solution, it is expedient to use one or more anionic, cationic, zwitterionic or nonionic low molecular weight or polymeric dispersing auxiliaries, such as, for example, diethylaminoethanol (DEAE), alkylamines, alkyl-sulfates, alkylsulfonates, alkyl phosphates, betaines, sulfobetaines, poly(vinyl alcohol-co-vinyl acetate-co-vinylacetal) in the most diverse monomer composition, poly(styrene-co-acrylic acid), saturated or unsaturated fatty acids, alkyl or alkenyl poly(glycol ether), fatty alcohol poly(glycol ether) or fatty alcohol poly(glycol ether-block-propylene glycol ether), nonionic dispersing auxiliaries being preferred.

The content of dispersing auxiliary or auxiliaries in a dispersion or solution of the hydrophobic compound can be 0.1 to 500 wt. %, preferably 0.1 to 50 wt. %, based on the amount of hydrophobic compound.

The average particle size ($d_{50}$ value) in the dispersion of the hydrophobic compound is below 500 μm, preferably below 1 μm, particularly preferably below 500 nm.

If metal soaps are used, these are preferably prepared by precipitation immediately before the addition to the metal hydroxides or are produced by precipitation in the reaction mixture only after addition to the layer-like metal hydroxide salts. In this procedure, the acid component, e.g. stearic acid, is dissolved in water, in a water-solvent mixture or in the reaction mixture, under the influence of heat, optionally also above the melting point of this component, and with the addition of alkali, such as, for example, solid or aqueous sodium hydroxide, and optionally one or more of the dispersing auxiliaries described above, and precipitation is then carried out by addition of an aqueous solution of the metal salt, such as, for example, a zinc sulfate, zinc chloride, zinc hydroxide, aluminum chloride, aluminum sulfate, aluminum hydroxide or zirconyl chloride solution. In this context, the molar ratio of the charges of the di-, tri- or tetravalent metal cation to those of the acid groups of the acid component of the metal soaps can be between 1:100 to 10:1, preferably between 1:50 and 5:1, in particular between 1:10 and 3:1.

When all the components have been combined and, if appropriate, the pH has been adjusted to a value of between 2 and 12, preferably 2 and 11, the reaction mixture is expediently separated off from the liquid phase over a filter, optionally under pressure and still in the heated state, washed free from impurities with deionized water or a water-solvent mixture, for example a water-alcohol mixture, the washing operation being controlled by means of the conductivity and a conductivity of the filtrate of <10 m S/cm being aimed for, and the product is then dried, for example by means of circulating air drying, vacuum drying, spin flush drying, spray drying or fluidized bed drying, and optionally ground to a powder.

The invention furthermore provides the use of the hydrophobic metal hydroxide salt according to the invention as a charge controlling agent in electrophotographic toners and developers, powder coatings, electret materials, electronic ink (e-ink), electronic paper (e-paper) and in electrostatic separation operations, and as an external additive for controlling the flowability and the charge of powder toners, and as an anti-offset agent.

In this context, the metal hydroxides according to the invention, individually or in combination with one another or with further components mentioned below, are incorporated homogeneously, for example by extrusion or kneading in, bead mills or with an Ultraturrax (high-speed stirrer), in a concentration of from 0.01 to 50 wt. %, preferably from 0.05 to 20 wt. %, particularly preferably from 0.1 to 5.0 wt. %, based on the total mixture, into the binder of the particular toner, developer, powder coating, electret material or of the polymer to be separated electrostatically. In this context, the compounds employed according to the invention can be added as dried and ground powders, colloidal solutions, press-cakes, masterbatches, preparations, mixed pastes, as compounds absorbed from aqueous or non-aqueous dispersion onto suitable carriers, such as e.g. silica gel, or mixed with such carriers, $TiO_2$, $Al_2O_3$, carbon black. The compounds used according to the invention can likewise in principle also already be added during the preparation of the particular binders, i.e. in the course of the polymerization, polyaddition or polycondensation thereof, and during the preparation of chemical toners, for example during the suspension or emulsion polymerization, or during the aggregation of the emulsified constituents to toner particles, and in the case of polyester-based chemical toners. The charge controlling agent particles which are present after the dispersion in the binder should be smaller than 1 μm, preferably smaller than 0.5 μm, a narrow particle size distribution being advantageous. The charge controlling agents according to the invention can also be employed in the form of finely divided, aqueous, aqueous-organic or organic dispersions. The particles sizes ($d_{50}$ values) are between 20 nm and 1 μm, preferably between 50 and 500 nm. Concentrations of charge controlling agent of between 0.01 and 50 wt. %, preferably between 0.1 and 30 wt. %, based on the total weight of the dispersion, are expedient.

In the case of aqueous or aqueous-organic dispersions, water is preferably employed in the form of distilled or desalinated water.

In the case of organic or aqueous-organic dispersions, including in the preparation of the compounds according to the invention, one or more organic solvents are employed as the organic medium, preferably from the group consisting of mono- or polyhydric alcohols, ethers and esters thereof, e.g. alkanols, in particular having 1 to 4 C atoms, such as e.g. methanol, ethanol, propanol, isopropanol, butanol, isobutanol; di- or trihydric alcohols, in particular having 2 to 6 C atoms, e.g. ethylene glycol, propylene glycol, 1,3-propanediol, 1,4-butanediol, 1,5-pentanediol, 1,6-hexanediol, 1,2,6-hexanetriol, glycerol, diethylene glycol, dipropylene glycol, triethylene glycol, polyethylene glycol, tripropylene glycol, polypropylene glycol; lower alkyl ethers of polyhydric alcohols, such as e.g. ethylene glycol monomethyl or ethyl or butyl ether, triethylene glycol monomethyl or ethyl ether; ketones and ketone alcohols, such as e.g. acetone, methyl ethyl ketone, di-ethyl ketone, methyl isobutyl ketone, methyl pentyl ketone, cyclopentanone, cyclohexanone, diacetone alcohol; amides, such as e.g. dimethylformamide, dimethylacetamide and N-methylpyrrolidone.

Conventional ionic or nonionic low molecular weight or polymeric dispersing auxiliaries, such as e.g. sulfates, sulfonates, phosphates, polyphosphates, carbonates, carboxylates, carboxylic acids, silicates, hydroxides, metal soaps, polymers, such as acrylates, fatty acid derivatives and glycoside compounds, can additionally also be employed for the preparation of stable dispersions.

The dispersions can furthermore contain metal-complexing agents, such as e.g. EDTA or NTA. The dispersions can furthermore also contain conventional additives, such as, for example, preservatives, biocides, antioxidants, degassing agents/defoamers and agents for regulating the viscosity, e.g. polyvinyl alcohol, cellulose derivatives or water-soluble natural or synthetic resins and polymers as film-forming agents or binders to increase the adhesive strength and abrasion resistance. Organic or inorganic bases and acids are employed as pH regulators. Preferred organic bases are amines, such as e.g. ethanolamine, diethanolamine, triethanolamine, diethylaminoethanol (DEAE), N,N-dimethylethanolamine, diisopropylamine, aminomethylpropanol or dimethylminomethylpropanol. Preferred inorganic bases are sodium hydroxide, potassium hydroxide, lithium hydroxide or ammonia. Further constituents can be hydrotropic compounds, such as e.g. formamide, urea, tetramethylurea, $\epsilon$-caprolactam, ethylene glycol, diethylene glycol, triethylene glycol, polyethylene glycol, butyl glycol, methylcellosove, glycerol, sugar, N-methylpyrrolidone, 1,3-diethyl-2-imidazolidinone, thiodiglycol, sodium benzenesulfonate, Na xylenesulfonate, Na toluenesulfonate, Na cumenesulfonate, Na benzoate, Na salicylate or Na butyl monoglycol sulfate.

The charge controlling agents employed according to the invention can also be combined with already known positively or negatively controlling charge controlling agents in order to achieve particular chargings, the total concentration of the charge controlling agents expediently being between 0.01 and 50 wt. %, preferably between 0.05 and 20 wt. %, particularly preferably between 0.1 and 5 wt. %, based on the total weight of the electrophotographic toner, developer, powder or powder coating.

Possible further charge controlling agents are, for example: triphenylmethanes; ammonium and immonium compounds, iminium compounds; fluorinated ammonium and fluorinated immonium compounds; bis-cationic acid amides; polymeric ammonium compounds; diallylammonium compounds; aryl sulfide derivatives, phenol derivative; phosphonium compounds and fluorinated phosphonium compounds; calix(n) arenes, cyclically linked oligosaccharides (cyclodextrins) and derivatives thereof, in particular boron ester derivatives, inter-polyelectrolyte complexes (IPECS); polyester salts; metal complex compounds, in particular salicylate-metal complexes and salicylate-nonmetal complexes, hydroxycarboxylic acid-metal complexes and hydroxycarboxylic acid-nonmetal complexes, benzimidazolones; azines, thiazines or oxazines which are listed in the Colour Index as pigments, solvent dyes, basic dyes or acid dyes, and highly disperse metal oxides, such as e.g. $SiO_2$, $TiO_2$ or $Al_2O_3$, which can be surface-modified, for example with carboxylate, amino, ammonium groups.

Examples of known charge controlling agents are listed in WO 01/40878 A1.

In order to prepare electrophotographic colored toners, also as a color toner set of two or more of the colors black, cyan, yellow, magenta, green, orange, red and blue, coloring agents, such as organic colored pigments, inorganic pigments or dyestuffs, conventionally in the form of powders, dispersions, press-cakes, solutions or masterbatches, are added.

The organic colored pigments can be from the group consisting of azo pigments or polycyclic pigments or mixed crystals (solid solutions) of such pigments.

Preferred blue and/or green pigments are copper phthalocyanines, such as C.I. Pigment Blue 15, 15:1, 15:2, 15:3, 15:4, 15:6, P. Blue 16 (metal-free phthalocyanine), or phthalocyanines with aluminum, nickel, iron or vanadium as the central atom, furthermore triarylcarbonium pigments, such as Pigment Blue 1, 2, 9, 10, 14, 60, 62, 68, 80, Pigment Green 1, 4, 7, 45; orange pigments, such as e.g. P.O. 5, 62, 36, 34, 13, 43, 71; yellow pigments, such as e.g. P.Y. 12, 13, 14, 17, 74, 83, 93, 97, 111, 122, 139, 151, 155, 180, 174, 175, 185, 188, 191, 213, 214, red pigments, such as e.g. P.R. 48, 57, 122, 146, 147, 149, 150, 184, 185, 186, 202, 207, 209, 238, 254, 255, 269, 270, 272, violet pigments, such as P.V. 1, 19, carbon black, iron/manganese oxides; furthermore mixed crystals of C.I. Pigment Violet 19 and C.I. Pigment Red 122.

Mixtures with organic dyestuffs are suitable in particular for increasing the brilliance, but also for adjusting the color shade. Such dyestuffs which are preferably to be mentioned are:

water-soluble dyestuffs, such as e.g. direct, reactive and acid dyes, and solvent-soluble dyestuffs, such as e.g. solvent dyes, disperse dyes and vat dyes. Examples which may be mentioned are: C.I. Reactive yellow 37, Acid yellow 23, Reactive Red 23, 180, Acid Red 52, Reactive Blue 19, 21, Acid Blue 9, Direct Blue 199, Solvent yellow 14, 16, 25, 56, 62, 64, 79, 81, 82, 83, 83:1, 93, 98, 133, 162, 174, Solvent Red 8, 19, 24, 49, 89, 90, 91, 92, 109, 118, 119, 122, 124, 127, 135, 160, 195, 212, 215, Solvent Blue 44, 45, Solvent Orange 41, 60, 63, Disperse Yellow 64, Vat Red 41, Solvent Black 45, 27.

The electrophotographic toners and powder coatings according to the invention can of course also comprise further added waxes, as mentioned above, for example as anti-offset agents.

The compounds according to the invention can be added individually or in combination with free-flow agents, such as e.g. highly disperse silicas, metal oxides or metal soaps, also as external additives, to finished powder toners to improve the flow, to improve the adhesion properties and for electrostatic fine adjustment.

The present invention also provides an electrophotographic toner, powder or powder coating comprising 30 to 99.99 wt. %, preferably 40 to 99.5 wt. % of a conventional binder, for example a styrene, styrene acrylate, styrene-butadiene, acrylate, urethane, acrylic, polyester or epoxy resin or a combination of the last two, 0.01 to 50 wt. %, preferably 0.05 to 20 wt. %, particularly preferably 0.1 to 5 wt. % of at least one hydrophobic salt-like metal hydroxide, and optionally 0.001 to 50 wt. %, preferably 0.05 to 20 wt. % of a coloring agent, in each case based on the total weight of the electrophotographic toner, powder or powder coating.

In the following examples, percent denotes percent by weight.

PREPARATION EXAMPLE 1

30 g of a hydrothermally prepared Mg—Al hydroxide carbonate ($MgO:Al_2O_3$=61:39 wt. %, Pural MG 61 HT, Sasol, Germany) are dispersed in 100 ml of deionized water for 30 min at 60° C. by means of stirring. 4.5 g of pulverulent sebacic acid are then added and the mixture is adjusted to a pH of approx. 8 by means of a 10% strength sodium hydroxide solution. After a reaction time of 2 hours, 60 g of a 10% strength aqueous montan acid wax dispersion, which has been prepared by addition of 10 parts of molten montan acid wax (Licowax S, Clariant, acid number 127-160 mg of KOH/g, drop point 79-85° C.) into an approx. 70° C. hot aqueous solution consisting of 2 parts of oleic acid, 4 parts of diethylaminoethanol (DEAE) and 84 parts of deionized water, are added. The reaction mixture is stirred for a further 1 hour at 85° C., subsequently cooled to approx. 50° C., thereafter the suspension is filtered off, the solid is rinsed several times with deionized water and then dried at 60-80° C. in vacuo.

Yield: 36.8 g of white powder.

| Characterization: | |
|---|---|
| Appearance: | white powder |
| DSC: | no detectable decomposition up to 400° C. |
| pH: | 7.9 |
| Conductivity: | 90 µS/cm |
| Residual moisture: | 1.6% |
| tan δ (1 kHz): | 0.5 |
| Ω cm: | $3 \times 10^9$ |
| Solubilities: | <1 g/l (20° C.) in water, ethanol, acetone, dimethylsulfoxide, n-hexane |
| Particle size distribution: | $d_{50} = 8$ µm, $d_{95} = 18$ µm (laser light diffraction) |

Average particle size after dispersion in diethyl ether: approx. 200 nm (transmission electron microscope)

PREPARATION EXAMPLE 2

30 g of a hydrothermally prepared Mg—Al hydroxide carbonate (MgO:$Al_2O_3$=70:30 wt. %, 0.1 to 3 wt. % of carbonate, Pural MG 70 HT, Sasol, Germany) are dispersed in 100 ml of deionized water for 30 min at 60° C. by means of stirring. 3.0 g of pulverulent sebacic acid are then added and the mixture is adjusted to a pH of approx. 8-9 by means of a 10% strength sodium hydroxide solution. After a reaction time of 1 hour, 90 g of a 10% strength aqueous montan acid ester wax dispersion, which has been prepared by addition of 10 parts of molten montan acid ester wax (Licowax F, Clariant, acid number 6-10 mg of KOH/g, drop point 75-81° C.) into an approx. 95° C. hot aqueous solution consisting of 0.7 parts of 21% strength KOH-ethylene glycol solution, 3 parts of 10% strength polyvinyl alcohol solution (Mowiol 4-88, Kuraray, Germany) and 86.3 parts of deionized water, are added. A further 3.0 g of pulverulent sebacic acid are then added and the mixture is adjusted to a pH of approx. 8-9 again by means of a 10% strength sodium hydroxide solution.

The reaction mixture is stirred for a further 1 hour at 80° C., subsequently cooled to approx. 50° C., thereafter the suspension is filtered off, the solid is rinsed several times with deionized water and then dried at 60-80° C. in vacuo.

Yield: 39.7 g of white powder.

PREPARATION EXAMPLE 3

25 g of an Mg—Al hydroxide carbonate (MgO:$Al_2O_3$=70:30 wt. %, carbonate content approx. 4 wt. %, Pural MG 70 C, Sasol, Germany) are dispersed in 100 ml of deionized water for 30 min at 60° C. by means of stirring. 4.5 g of pulverulent sebacic acid are then added and the mixture is adjusted to a pH of approx. 8-9 by means of a 10% strength sodium hydroxide solution. After a reaction time of 1 hour, an aqueous aluminum stearate dispersion, which has been prepared by dissolving 5 parts of stearic acid, 95 parts of deionized water, 1.8 parts of sodium hydroxide, 8 parts of iso-propanol and 0.5 part of coconut fatty alcohol polyglycol ether (Genapol C 050, Clariant, Germany) at 80° C., subsequent precipitation at the same temperature with a solution of 6.0 parts of $Al_2(SO_4)_3 \cdot 18H_2O$ in 50 parts of deionized water and adjustment of the precipitated suspension to a pH of 8-9, is added. A further 2.0 g of sebacic acid, dissolved in 20 g of aqueous sodium hydroxide solution, are then added and the mixture is adjusted to a pH of approx. 8-9 again.

The reaction mixture is stirred for a further 1 hour at 80° C., subsequently cooled to approx. 50° C., thereafter the suspension is filtered off, the solid is rinsed several times with deionized water and then dried at 60-80° C. in vacuo.

Yield: 31.8 g of white powder.

The compounds listed in the following table are prepared in an analogous manner:

PREPARATION EXAMPLES 4 TO 13

| Ex. no. | Metal hydroxide/oxide | Anion(s) | According to Ex. | Wax/wax-like component |
|---|---|---|---|---|
| 4 | Pural MG 70 C | sebacic acid | 2 | Licowax S |
| 5 | Pural MG 70 C | Stearic acid | 2 | Licowax F |
| 6 | Pural MG 70 HT | sebacic acid | 2 | Licowax S |
| 7 | Pural MG 70 HT | sebacic acid | 3 | Al stearate |
| 8 | Pural MG 61 HT | sebacic acid | 1 | Licowax F |
| 9 | Pural MG 61 HT | benzilic acid | 3 | ZrO stearate |
| 10 | Pural MG 70 | sebacic acid | 1 | erucic acid amide |
| 11 | Pural MG 70 | sebacic acid | 3 | Zn stearate |
| 12 | Pural MG 30 | salicylic acid | 1 | Licowax S |
| 13 | Puralox MG 70 (calcined) | sebacic acid | 1 | Licowax S |

| Characterization of Preparation Example 4 | |
|---|---|
| Appearance: | white powder |
| DSC: | no decomposition up to 400° C. |
| pH: | 7.7 |
| Conductivity: | 110 µS/cm |
| Residual moisture: | 1.2% |
| tan δ (1 kHz): | 1.1 |
| Ω cm: | $1 \times 10^9$ |
| BET | 36.4 m²/g |
| Particle size distribution: | $d_{50} = 7$ µm, $d_{95} = 17$ µm (laser light diffraction) |
| Solubilities: | <1 g/l (20° C.) in water, ethanol, acetone, dimethylsulfoxide, n-hexane |

Average particle size after dispersion in diethyl ether: approx. 150 nm (transmission electron microscope)

| Characterization of Preparation Example 7 | |
|---|---|
| Appearance: | white powder |
| DSC: | no decomposition up to 400° C. |
| pH: | 6.7 |
| Conductivity: | 195 µS/cm |
| Residual moisture: | 1.4% |

-continued

| Characterization of Preparation Example 7 | |
|---|---|
| tan δ (1 kHz): | 1.0 |
| Ω cm: | $6 \times 10^9$ |
| BET | 33.5 m$^2$/g |
| Particle size distribution: | $d_{50} = 8$ μm, $d_{95} = 17$ μm (laser light diffraction) |
| Solubilities: | <1 g/l (20° C.) in water, ethanol, acetone, dimethylsulfoxide, n-hexane |

Average particle size after dispersion in diethyl ether: approx. 150 nm (transmission electron microscope)

USE EXAMPLE 1a 1 part of the compound from Preparation Example 1 is incorporated homogeneously into 99 parts of a polyester resin based on bisphenol A (®Fine Tone 382-ES) by means of a kneader in the course of 30 minutes. The mixture is subsequently ground on a laboratory universal mill and then graded on a centrifugal sifter. The desired particle fraction (4 to 25 μm) is activated at 25° C./40-60% rel. atmospheric humidity with a carrier which comprises silicone-coated ferrite particles 50 to 200 μm in size.

USE EXAMPLE 1b

The procedure is as in Use Example 1a, the activation of the toner with the carrier being carried out after 24 hours of storage of the toner-carrier mixture at 25° C./90% rel. atmospheric humidity.

The measurement is carried out on a conventional q/m measuring station. By using a sieve having a mesh width of 45 μm, it is ensured that no carrier is carried along when the toner is blown out. The q/m values [μC/g] stated in the following table are measured according to the duration of the activation:

| | Use Example | |
|---|---|---|
| | 1a | 1b |
| Duration of activation | Charging q/m [μC/g] | |
| 5 min | −19 | −10 |
| 10 min | −20 | −11 |
| 30 min | −22 | |
| 2 h | −22 | |

USE EXAMPLES 2a TO 13

The procedure is as in Use Example 1, the compounds of the other preparation examples being employed instead of the compound from Preparation Example 1. The compounds employed in the use examples correspond to the preparation examples of the same number.

| Ex. no. | According to Use Ex. | q/m [μC/g] | | | |
|---|---|---|---|---|---|
| | | 5 min | 10 min | 30 min | 2 h |
| 2a | 1a | −20 | −22 | −23 | −24 |
| 2b | 1b | −10 | −10 | | |
| 3a | 1a | −21 | −22 | −23 | −25 |
| 3b | 1b | −10 | −11 | | |
| 4 | 1a | −17 | −19 | −10 | −20 |
| 5a | 1a | −19 | −21 | −22 | −22 |
| 5b | 1b | −9 | −10 | | |
| 6 | 1a | −17 | −18 | −19 | −20 |
| 7a | 1a | −20 | −22 | −23 | −23 |
| 7b | 1b | −10 | −11 | | |
| 8a | 1a | −20 | −21 | −21 | −22 |
| 8b | 1b | −10 | −10 | | |
| 9 | 1a | −19 | −20 | −21 | −21 |
| 10a | 1a | −20 | −21 | −22 | −22 |
| 10b | 1b | −10 | −10 | | |
| 11 | 1a | −21 | −22 | −23 | −23 |
| 12 | 1a | −15 | −16 | −16 | −17 |
| 13 | 1a | −17 | −18 | −18 | −18 |

USE EXAMPLES 14 TO 19

The procedure is as in Use Example 1a, 2a or 3a, in each case 0.5 or 2 parts of the particular compounds from the corresponding preparation examples being employed instead of 1 part.

| Ex. no. | Preparation Ex. no. | Parts | q/m [μC/g] | | | |
|---|---|---|---|---|---|---|
| | | | 5 min | 10 min | 30 min | 120 min |
| 14 | 1 | 0.5 | −17 | −18 | −19 | −19 |
| 15 | 1 | 2 | −22 | −24 | −25 | −25 |
| 16 | 2 | 0.5 | −18 | −19 | −20 | −20 |
| 17 | 2 | 2 | −23 | −25 | −27 | −27 |
| 18 | 3 | 0.5 | −18 | −19 | −21 | −21 |
| 19 | 3 | 2 | −24 | −26 | −28 | −28 |

USE EXAMPLES 20 TO 25

The procedure is as in Use Example 1a or 3a, 5 parts of an organic pigment (carbon black ®Mogul L, Cabot; ®Toner Magenta E 02, Clariant (C.I. Pigment Red 122); ®Toner yellow HG, Clariant (C.I. Pigment Yellow 180)) additionally also being incorporated.

| Ex. no. | Parts | Preparation Ex. | Organic pigment | q/m [μC/g] | | | |
|---|---|---|---|---|---|---|---|
| | | | | 5 min | 10 min | 30 min | 120 min |
| 20 | 1 | 1 | Toner Magenta E 02 | −18 | −19 | −20 | −20 |
| 21 | 1 | 1 | Toner Yellow HG | −20 | −21 | −22 | −23 |
| 22 | 1 | 1 | carbon black | −18 | −19 | −19 | −19 |
| 23 | 1 | 3 | Toner Magenta E 02 | −19 | −21 | −22 | −22 |
| 24 | 1 | 3 | Toner Yellow HG | −21 | −22 | −23 | −23 |
| 25 | 1 | 3 | carbon black | −20 | −21 | −21 | −21 |

USE EXAMPLES 26 TO 28

The procedure is as in Use Example 1a, 2a or 3a, 2 parts of a coloring agent having an electrostatically positive intrinsic effect (C.I. Solvent Blue 125—additionally also being incorporated.

| Ex. no. | Preparation Ex. | Parts of coloring agent | q/m [µC/g] | | | |
|---|---|---|---|---|---|---|
| | | | 5 min | 10 min | 30 min | 120 min |
| 26 | 1 | 2 | −8 | −5 | −4 | −2 |
| 27 | 2 | 2 | −7 | −4 | −3 | −1 |
| 28 | 3 | 2 | −9 | −6 | −4 | −3 |

COMPARISON EXAMPLE A

The procedure is as in Use Example 1a and 1b, but instead of the compound from Preparation Example 1, the corresponding compound is employed without the hydrophobizing step according to the invention:

| | Comparison Example A | |
|---|---|---|
| Duration of activation | according to 1a | according to 1b |
| | Charging q/m [µC/g] | |
| 5 min | −19 | −2 |
| 10 min | −21 | −2 |
| 30 min | −22 | |
| 2 h | −23 | |

The tribocharging under high atmospheric humidity conditions is significantly less pronounced than in the case of the product according to the invention.

COMPARISON EXAMPLE B

The procedure is as in Use Example 8a and 8b, but instead of the compound from Preparation Example 8, the corresponding compound is employed without the hydrophobizing step according to the invention, but with the addition of 2 wt. %, based on the total weight of the toner, of pulverulent wax (Licowax F, Clariant) into the binder system:

| | Comparison Example B | |
|---|---|---|
| Duration of activation | according to 1a | according to 1b |
| | Charging q/m [µC/g] | |
| 5 min | −21 | −3 |
| 10 min | −22 | −3 |
| 30 min | −23 | |
| 2 h | −24 | |

The tribocharging under high atmospheric humidity conditions is significantly less pronounced than in the case of the product according to the invention. This means that the separate addition of the pulverulent wax shows no hydrophobizing effects at all in respect of the tribocharging, even though it is employed in a much higher amount than in Preparation Example 8.

The invention claimed is:

1. A process for manufacturing a hydrophobic salt of a layer-like metal hydroxide comprising the step of adding to a layer-like metal hydroxide salt containing trivalent, divalent and, optionally, monovalent metal cations, and one or more organic anions A of the formula (1)

$$X-R-Y \qquad (1),$$

wherein
X is hydrogen, hydroxyl, carboxyl, sulfato or sulfo;
Y is carboxyl, sulfato or sulfo, and
R is an aliphatic, cycloaliphatic, heterocycloaliphatic, olefinic, cycloolefinic, heterocycloolefinic, aromatic, heteroaromatic, araliphatic or heteroaraliphatic radical having 2 to 50 carbon atoms, wherein one or more substituents selected from the group consisting of hydroxyl, amino, halogen, $C_1$-$C_{22}$-alkyl, $C_1$-$C_{22}$-alkoxy, $C_1$-$C_{22}$-alkylene-(CO)—O—$(CH_2CH_2O)_{0-50}$-alkyl, $C_1$-$C_{22}$-alkylene-(CO)—O—$(CH_2CH_2O)_{0-50}$-haloalkyl, carboxyl, sulfo, nitro and cyano is optionally present,
in a dispersion, with intensive thorough mixing, one or more hydrophobic compounds selected from the group consisting of waxes metal soaps or a mixture thereof in an amount of from 0.2 to 200 wt. %, based on the metal hydroxide salt, and optionally removing the liquid medium to form a product, optionally drying the product and optionally isolating the product as a powder,
wherein the metal soap is a compound selected from the group consisting of di-, tri- or tetravalent metals salts of saturated or unsaturated $C_7$-$C_{43}$-carboxylic acids, $C_8$-$C_{44}$-sulfonates, $C_8$-$C_{44}$-sulfates, $C_8$-$C_{44}$-phosphates, acid waxes, partly esterified acid waxes, partly hydrolyzed ester waxes and oxidized PE waxes, or
wherein the metal soap is a compound selected from the group consisting of di-, tri- or tetravalent metals salts of $C_8$-$C_{44}$-alkyl ether-sulfates, $C_8$-$C_{44}$-alkylamido ether-sulfates, $C_8$-$C_{44}$-aralkylsulfonates, wherein aryl is $C_6$-$C_{12}$ and alkyl is $C_1$-$C_{32}$, $C_8$-$C_{44}$-alkyl ether-sulfosuccinates, $C_8$-$C_{44}$-N-alkylsulfosuccinamates, $C_8$-$C_{44}$-acyl glutamates, $C_8$-$C_{44}$-fatty acid isethionates, $C_8$-$C_{44}$-fatty acid methyltaurides, and $C_8$-$C_{44}$-fatty acid sarcosides.

2. The process as claimed in claim 1, wherein the one or more hydrophobic compounds are added in an amount of from 1 to 200 wt. %, based on the metal hydroxide salt.

3. The process as claimed in claim 1, wherein the metal hydroxide is a multiple hydroxide, wherein the molar ratio of the divalent metal cations to the trivalent metal cations is between 1,000 and 0.001.

4. The process as claimed in claim 1, wherein the divalent metal cations are $Mg^{2+}$, $Ca^{2+}$, $Sr^{2+}$, $Ba^{2+}$, $Zn^{2+}$, $Co^{2+}$, $Ni^{2+}$, $Fe^{2+}$, $Cu^{2+}$ or $Mn^{2+}$.

5. The process as claimed in claim 1 the trivalent metal cations are $Al^{3+}$, $Fe^{3+}$, $Co^{3+}$, $Mn^{3+}$, $Cr^{3+}$, $Sc^{3+}$, or $B^{3+}$.

6. The process as claimed in claim 1, wherein the organic anion A is
benzilic acid, salicylic acid, benzoic acid, a naphthalenedisulfonic acid, a naphthalenedicarboxylic acid, a hydroxynaphthoic acid, lactic acid, stearic acid, arachic acid, behenic acid, erucic acid, octanedicarboxylic acid, decanedicarboxylic acid (sebacic acid), dodecanedicarboxylic acid, tetradecanedicarboxylic acid, hexadecanedicarboxylic acid, octadecanedicarboxylic acid, naphthalenetetracarboxylic acid, sulfosuccinic acid $(C_6$-$C_{20})$-alkyl monoesters or sulfosuccinic acid $(C_6$-$C_{22})$-fluoroalkyl monoesters.

7. The process as claimed in claim 1, wherein the wax is a compound selected from the group consisting of acid waxes, ester waxes, amide waxes, carnauba waxes, polyolefin waxes, polyolefin degradation waxes, oxidized PE, oxidized PP waxes, PP waxes modified by grafting with monomers, polyolefin metallocene waxes and paraffin waxes or a mixture thereof.

8. The process as claimed in claim 1, wherein the hydrophobic salt of a layer-like metal hydroxide is an Mg—Al double hydroxide salt having a molar ratio of Mg:Al of from 1,000:1 to 1:1,000, with 0.1 to 30 wt. % of sebacic acid, 0.1 to 75 wt. % of stearic acid or a mixture thereof as the organic anion; and with 1 to 150 wt. % of the the one or more hydrophobic compounds, in each case based on the weight of the Mg—Al double hydroxide salt, of montan acid wax, wherein the one or more hydrophobic compounds is a partly esterified montan acid wax, hydroxystearic acid ester wax, erucic acid amide wax, behenic acid amide wax, carnauba wax, montan acid ester wax, partly hydrolyzed montan acid ester wax, polyolefin wax which is oxidized or rendered polar by grafting, a Zn, Pb, Sn, TiO, ZrO, Mg, Ca, Sr, Ba or Al salt of saturated or unsaturated $C_7$-$C_{43}$-carboxylic acids, $C_8$-$C_{44}$-sulfonates, $C_8$-$C_{44}$-sulfates, $C_8$-$C_{44}$-phosphates, acid waxes, partly esterified acid waxes, partly hydrolyzed ester waxes or oxidized PE waxes.

9. The process as claimed in claim 1, wherein the hydrophobic salt of a layer-like metal hydroxide is a magnesium-aluminum double hydroxide carbonate with 0.1 to 4 wt. % of carbonate, having a molar ratio of Mg to Al of from 5:1 to 1:5, with 0.1 to 20 wt. % of mono- or di-anions of sebacic acid, or a mixture thereof, 0.1 to 50 wt. % of stearic acid; and with 2 to 100 wt. %, in each case based on the weight of the Mg—Al double hydroxide carbonate, of one or more waxes selected from the group consisting of montan acid waxes, montan acid ester waxes, partly hydrolyzed montan acid ester waxes, hydroxystearic acid ester waxes, erucic acid amide waxes, behenic acid amide waxes, carnauba waxes, oxidized or grafted polyolefin waxes, or the Mg, Ca, Zn, Al or ZrO salts of stearic acid, arachic acid, behenic acid, erucic acid, dodecylsulfuric acid and coconut alkylsulfonic acid.

10. The process as claimed in claim 1, wherein the one or more hydrophobic compounds are added in an amount of from 1 to 200 wt. %, based on the metal hydroxide salt and wherein the dispersion is an aqueous, aqueous-organic or organic dispersion.

11. The process as claimed in claim 1, wherein the dispersion is an aqueous, aqueous-organic or organic dispersion, and wherein the metal soap is produced by precipitation in the aqueous, aqueous-organic or organic dispersion.

12. The process as claimed in claim 1, wherein the one or more hydrophobic compounds is added as a solution or aqueous dispersion at a temperature of between 20 and 200 ° C.

13. A hydrophobic salt of a layer-like metal hydroxide made in accordance with the process of claim 1.

14. A charge controlling agent in electrophotographic toners, electrophotographic developers, powder coatings, electret materials, electronic inks, electronic papers and in electrostatic separation operations, comprising a hydrophobic salt of a layer-like metal hydroxide as claimed in claim 13.

15. An external additive in electrophotographic toners and electrophotographic developers for controlling the flowability and the charge of powder toners, and as an anti-offset agent, comprising a hydrophobic salt of a layer-like metal hydroxide as claimed in claim 13.

* * * * *